Aug. 15, 1950   H. I. MANDOLF ET AL   2,518,482
FISHING REEL
Filed Aug. 20, 1947
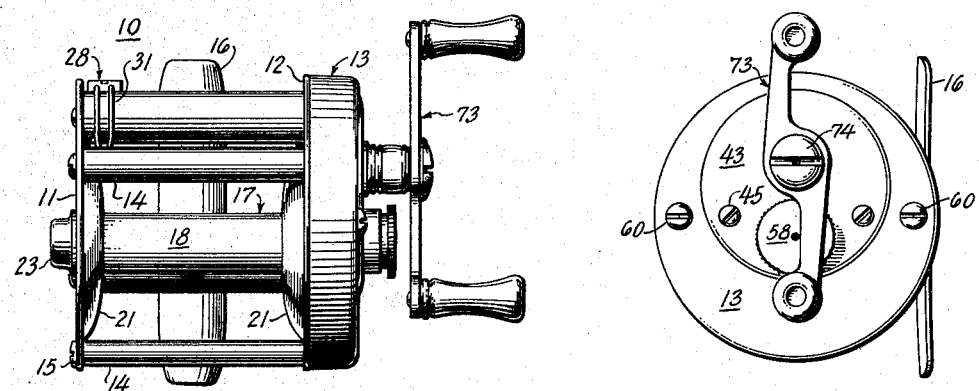
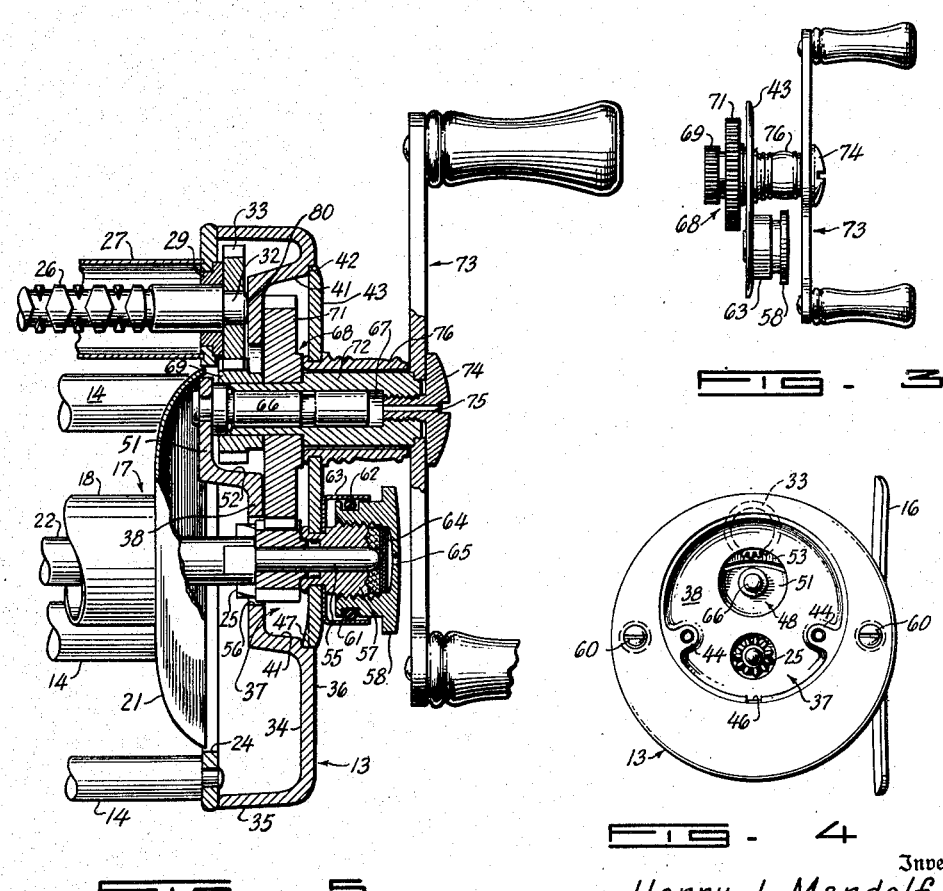
Inventors
Henry I. Mandolf &
Howard R. Chapin
By Walter J. Jason
Attorney Patented Aug. 15, 1950

2,518,482

UNITED STATES PATENT OFFICE 2,518,482

FISHING REEL

Henry I. Mandolf and Howard R. Chapin, San Diego, Calif., assignors to Langley Corporation, a corporation of California Application August 20, 1947, Serial No. 769,603

17 Claims. (Cl. 242—84.1)

The present invention relates to fishing reels and more particularly to improvements in level winding casting fishing reels.

An object of the invention is to provide a fishing reel embodying a gear housing of improved design and construction.

Another object of the invention is the provision of a fishing reel of an improved construction wherein certain major components are readily disassembled for inspection, lubrication or repair.

Another object of the invention is to provide a fishing reel incorporating a gear housing having an improved construction whereby the crank together with the drive gears for the spool wind shaft and the level wind shaft may be removed from the reel frame in assembled relation and independently of removal of the housing.

Another object of the invention is to provide a fishing reel embodying a gear housing of novel and improved construction which is adapted for ready removal from the reel frame and on removal to carry with it the crank and the drive gears for the spool wind shaft and the level wind shaft and in assembled relation thereon.

Another object of the invention resides in the provision of a fishing reel having an improved gear housing so constructed as to render the mounting of the various gears of the fishing reel an easy task.

A further object of the invention lies in providing an improved gear housing for a fishing reel wherein very accurate center distances are easily maintained in production to assure a smoothly operating gear train.

A still further object of the invention resides in the provision of a fishing reel having an improved form of gear housing which is simple and economical of manufacture and which results in a more efficient and effective fishing reel.

Other objects and features of this invention will be readily apparent to those skilled in the art from the following specification and appended drawings illustrating certain preferred embodiments of the invention in which:

Figure 1 is a top plan view of a level winding fishing reel embodying the invention;

Figure 2 is an end view of the fishing reel of Figure 1;

Figure 3 is a view in elevation of the crank and drive gear assembly;

Figure 4 is an elevational view of the gear housing with the crank and drive gear assembly removed; and Figure 5 is an enlarged fragmentary view partially in section of the fishing reel of Figure 1.

Having particular reference now to the drawings, in connection with which like characters of reference will designate corresponding parts throughout, there is shown illustrated a level winding fishing reel frame 10 comprising a tail plate 11, head plate 12 and a head cap or housing 13. A plurality of pillars 14 connect tail plate 11 to head plate 12 and maintains them in spaced relation. Pillars 14 are disposed with one of their ends abutting tail plate 11 and are secured thereto by screws or studs 15 tapped into these ends. The opposite ends of the pillars 14 are shouldered to receive head plate 12, which plate is secured to the pillars by any practical means such as peening or upsetting of these ends, or they could be secured as by screws. A usual reel seat plate 16 is provided for the fishing reel, being mounted upon two adjacent pillars 14 by suitable connecting means.

A spool 17 is provided comprising a cylindrical drum portion 18 having dished plates or flanges 21 secured at each end thereof. A shaft 22 passes coaxially through the drum portion 18 and through the flanges 21 being suitably rigidly connected to the flanges. One end of shaft 22 is supported at the tail plate 11 upon a bearing 23 carried by the tail plate. An annular opening 24 is provided in opposing head plate 12 which is adapted to receive a flange 21 and through which opening the spool 17 may be withdrawn from the frame after removal of housing 13. A pinion 25 for the spool 17 is carried by shaft 22.

The level wind mechanism for this fishing reel comprises a conventional reversely threaded line guide traversing shaft 26, a protecting housing or guard 27 for the shaft, mounted between and suitably supported by the tail plate 11 and the head plate 12, and a line guide carriage 28 slidable along the shaft. The line guide carriage 28 includes a usual shaft engaging pawl, not shown, and a line guide eye 31 extending over the guard 27. One end of traversing shaft 26 is carried by tail plate 11 by a bearing, not illustrated, mounted thereon. A bearing 29 provided on head plate 12 rotatably supports the opposite end. Shaft 26 is provided with a reduced portion 32 mounting a pinion 33. Traversing shaft 26, it is noted, is located relative to tail plate 11 and head plate 12, substantially at the peripheries thereof, while the spool shaft 22 lies well within the confines of these plates but with its axis offset to the axis of the fishing reel.

The head cap or generally cup-shaped housing 13, as illustrated, comprises a base 34 having a peripheral out-turned flange 35 extending therefrom and, in the assembled state, directed toward head plate 12. Into the exterior face 36 of base 34 there is impressed, stamped or otherwise formed on annular recess or gear chamber 37, which chamber is provided with a base 38 and an annular defining wall 41. Chamber 37, it is noted, opens outwardly of the fishing reel which is opposite to the direction that the chamber defined by peripheral flanges 35 opens. Chamber 37 is eccentrically disposed on head cap 13.

An annular recess or rabbet 42 is provided in exterior surface 36 of head cap 13 and surrounds the gear chamber 37, and is adapted to receive the peripheral rim of a cover plate 43 which closes the chamber 37. A spaced pair of mounting lugs 44 are provided in chamber 37, to which lugs 44 the cover plate 43 for the chamber 37 is secured as by a pair of screws 45 passing through openings in the plate 43 and tapped into the upper surfaces of lugs 44. A notch 46 provided in the annular wall 41 of chamber 37 cooperates with a finger-like piece 47, cut from plate 43 and inwardly pressed therefrom, to positively locate the cover plate 43 upon the exterior surface 36 of head cap 13.

Into the base 38 of chamber 37 there is in turn impressed or formed a smaller annular gear chamber 48 which is provided with a base 51 and an arcuate wall 52. Chambers or recesses 37 and 48 in effect constitute a single recess in base 38 within which a drive gear assembly, to be described, is disposable. It is noted that the wall 52 does not continue in a complete ring but rather a portion thereof is removed together with a segment of the base 51 to provide an opening 53 which allows access from one side of the head cap 13 to the other.

The head cap or housing 13 is formed of aluminum, or other suitable light-weight material, which is readily stamped or die-cast into the required shape or formation. As described, housing 13 is preferably required to be provided with an eccentrically located annular gear chamber 37 impressed in the exterior surface 36 of base 34 of the head cap, and with a second annular gear chamber 48 impressed in the base 51 of the first chamber 37 and eccentrically located.

With the formation of the two annular gear chambers or recesses 37 and 48 in head cap 13 there will be provided three flat surfaces disposed in three levels and parallel each to the others. These levels are comprised of base 34 furthest spaced from head plate 12, when the housing 13 is assembled on frame 10, base 38 disposed substantially centrally of housing 13, and base 51, which, as shown in Figure 5, lies in a plane which is exterior of housing 13. When housing 13, in assembly, is disposed with its peripheral flange 35 abutting head plate 12 base 51 will lie within opening 24 in the head plate and substantially in the plane of the head plate.

Spool shaft 22, as indicated hereinbefore, carries a pinion 25. The pinion 25 is suitably non-rotatably secured to shaft 22 upon the reduced extension or spindle 55 provided at the end of shaft 22. Base 38 of chamber 37 is apertured, as at 56, to admit spindle 55 whereby spool pinion 25 will extend into chamber 37 as shown. An externally threaded cylindrical bearing 57 is suitably secured in an opening provided in cover plate 43. A bearing cap or thrust bearing nut 58 is threaded onto the bearing 57 and is adapted for longitudinal adjustment thereon. An annular groove 61 provided on the exterior of the nut 58 accepts a resilient retainer ring 62, which retainer ring 62 is adapted to engage and press against the interior wall surface of a cup-shaped housing 63 disposed in surrounding relation thereto. The retainer ring 62 serves to maintain nut 58 in adjusted position on bearing 57.

Bearing 57 is provided with an axial bore in which is journalled the spindle 55 of spool shaft 22 whereby the spool 17 is maintained in the fishing reel in accurate radial disposition when cover plate 43 and its supporting housing 13 are mounted on frame 10. Further, it is noted that the spool 17 cannot be removed so long as housing 13 is in assembled position. Bearing 57 together with the surfaces 38 and 51 which close portions of opening 24 will retain the spool 17 within the frame. A pair of screws 60 secure housing 13 to head plate 12, though more may be utilized if desired.

Bearing cap 58 provided on bearing 57 is utilized in the adjustment of the end play of spool shaft 22 and carries in a recess provided therein end play washers 64 adapted to engage the spheroid end of spindle 55. The end play washers 64 serve as a frictional locking means for spool shaft 22 and provide a drag or braking action to prevent over-running of the spool 17 when casting. The bearing cap 58 adjusts the amount of this frictional force applied to the end of spool shaft 22. The bearing cap 58 is provided with a bore 65 communicating with the interior thereof whereby oil for lubrication may be introduced. The frictional device for preventing over-running of the spool that has just been described is not the subject of the present invention but does provide the subject matter of a co-pending application filed May 31, 1946, and bearing the Serial No. 673,305.

A stub shaft 66 is rigidly mounted upon base 51 of chamber 48 and projects outwardly therefrom through chamber 48 and chamber 37. Stub shaft 66 is adapted to extend into an axial bore 67 provided in drive member 68 to removably and rotatably support this member. The drive member 68 comprises a gear or pinion 69 adapted to mesh with traversing shaft pinion 33, and a gear 71 of large diameter, horizontally spaced from pinion 69, for meshing with spool pinion 25 when the parts are in assembled relation. As particularly shown in Figure 5 secondary drive gear 69 will lie or be disposed in its operative position within chamber 48 and primary drive gear 71 will be disposed within chamber 37. With cover plate 43 in assembled position on frame 10 access to these chambers and to their contained gears will be denied and a self-contained gear box is effected and dirt and other foreign matter cannot enter nor will there be any exuding of grease.

The drive member 68 includes an extended cylindrical member 72 which serves as a crank shaft upon which is mounted a crank 73 and which shaft mounts the small and large gears 69 and 71 for movement with it. A screw 74, having a lubricating bore 75 therethrough, secures crank 73 to crank shaft 72. It is understood that other means for securing crank 73 may be employed; for example, crank shaft 72 may be threaded on the outside at crank end and crank 73 held in place by a nut. The cover plate 43 is provided with an outwardly projecting tubular element or thimble 76, which is rigidly secured thereto in a suitable manner or which, if desired, could be formed integral with cover plate 43. The drive gear assembly 68 normally bears against the inner end of thimble 76, as shown in the drawings, to provide in effect a thrust bearing therefor. The thimble 76 receives the crank shaft 72 and normally the small and large drive gears 69 and 71 and the crank 73 upon the cover plate 43 will be carried therewith. Cover plate 43, it is obvious, functions as a support member in carrying the drive gears 69 and 71 and the crank 73. Placing cover plate 43 in assembled position readily locates the drive gears in their operative position with cover plate 43 being accurately located on housing 13 by rabbet 42, cover attaching screws 45 and the locating means 46. It is obvious from the drawings that with the removal of crank retaining screw 74, the crank 73 is detachable from crank shaft 72 and the latter may then be axially moved to withdraw from thimble 76 and free drive member 68.

With housing 13 mounted on head plate 12 the end of the reduced portion 32 of traversing shaft 26 will bear against the outside of base 38 of chamber 37 upon a portion thereof as indicated at 80. Thus the exterior surface of base 38 serves as an end thrust bearing for shaft 26 and prevents the shaft from moving end-wise out of operative position. To care for wear at point 80 the surface could be plated or otherwise made wear resistant such as by the use of a suitable thrust button.

It is noted that the various gears of the fishing reel described herein are disposed, when in operative relationship, in various chambers, with traversing shaft pinion 33 located in the main or interior annular gear chamber opening onto head plate 12 defined by peripheral flange 35 of housing 13, small-diameter drive gear 69 is located in gear chamber 48, and large-diameter drive gear 71 is located in gear chamber 37 as is spool shaft pinion 25.

The arrangement of the various elements and parts of the present fishing reel enables the production of a simple and compact structure wherein the various components are readily assembled in their operative positions.

The provision of the improved form of housing 13 with its exterior recess forming a gear housing, and its readily removable cover plate or support member 43, effects a construction wherein the various bearings and gears are accurately located thus insuring accurate center distances for the gear trains. This accurate locating of the various operating parts is very readily secured in the present invention and comparatively little care is required in assembling the parts by reason of this inherent accuracy. Tolerances are much easier controlled herein because of the relatively few parts that go to make up the basic structure of this fishing reel. Since accurate locations for the various parts are more readily attained with the present construction it will be easier and more economical to manufacture.

With the present construction the fishing reel is more easily maintained, cleaned and greased. It is not necessary to remove the housing 13 each time access to the gear trains is desired because of the ready removability of the cover plate 43 which carries the drive gears with it when it is detached from housing 13. If only the gears are desired to be inspected, cleaned or repaired this feature insures that the remaining elements of the fishing reel such as the spool and the traversing shaft will be maintained in operative position. It is important to note that there is less chance of losing any parts since only one major component has been removed, and it is an assembled unit.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

We claim:

1. In a fishing reel in combination, a tail plate and a head plate, said plates being interconnected, a spool provided with a pinion, a line guide traversing shaft, a pinion provided therefor, drive gears coacting with said spool pinion and said traversing shaft pinion, a crank for actuating said drive gears, and a housing positioned adjacent said head plate, said housing having an interior gear chamber opening onto said head plate and a recess upon its exterior face, said interior gear chamber and said recess having communication one with the other and wherein said gears and pinions are disposed in operative relationship, and a cover for closing said exterior recess.

2. In a fishing reel in combination, a tail plate and a head plate, said plates being interconnected, a spool provided with a pinion, a line guide traversing shaft, a pinion provided therefor, drive gears coacting with said spool pinion and said traversing shaft pinion, a crank for actuating said drive gears, and a housing positioned adjacent said head plate, said housing being of generally cup-shape to provide a gear chamber opening on said head plate and comprising a base having the inner surface thereof facing said head plate, said base having a recess provided in the exterior face thereof, which recess communicates with said gear chamber, said drive gears being operatively mounted in said recess, and a cover plate for closing said recess.

3. In combination in a fishing reel, a frame, a detachable housing mounted adjacent said frame, a spool, a pinion therefor, a bearing for said spool supported in operative position on said housing, a line guide traversing shaft having a pinion operatively associated therewith, a drive gear assembly for actuating said spool and traversing shaft pinions, said housing having a recess provided in its exterior surface within which said drive gear assembly is disposed, a removable cover closing said recess, a crank and a crank shaft carried by said cover and removable therewith.

4. In combination in a fishing reel, a frame, including a tail plate and a head plate interconnected by pillars, a detachable housing mounted adjacent said frame, a spool, a pinion therefor, a bearing for said spool supported in operative position on said housing, a line guide traversing shaft having a pinion operatively associated therewith, a drive gear assembly for actuating said spool and traversing shaft pinions, said housing having a recess provided in its exterior surface within which said drive gear assembly is disposed, a removable cover closing said recess and providing a support for said drive gear assembly, a crank, and a crank shaft carried by said cover and all of said cover supported elements being removable therewith and in assembly.

5. The combination in a level winding fishing reel of a frame, a removable housing mounted adjacent said frame, a spool provided with a pinion, a bearing for said spool, a line guide traversing shaft provided with a pinion, an end thrust bearing surface for said traversing shaft provided on said housing, a drive gear assembly operatively interconnected with said spool pinion and said traversing shaft pinion, said housing having a recess provided in its exterior surface within which said drive gear assembly is located, a removable cover on said housing for closing said recess, said removable cover supporting said spool bearing, a stub shaft carried by said housing adapted to receive a crank shaft, and a crank, said crank shaft, crank, and drive gear assembly all being mounted on said cover, and being removable in assembled relation on said cover together with said spool bearing.

6. In combination in a fishing reel, a frame including interconnected tail and head plates, a spool, a pinion operatively associated therewith, a reversely threaded shaft, a pinion carried by said shaft, a drive gear meshing with said spool pinion, a second drive gear meshing with said shaft pinion, a drive shaft for actuation of said drive gears, a crank for said drive shaft, and a housing mounted adjacent said head plate, said housing being provided with an inwardly facing gear chamber and an outwardly facing recess formed therein having communication one with the other and wherein said gears and pinions are disposed in operative relationship, with base surfaces provided by said gear chamber and said recess being spaced axially from one another, and a removable cover for closing said outwardly facing recess.

7. In a fishing reel of the class described, the combination of tail and head plates, connecting pillars between said plates, a spool, a line guide reversely threaded traversing shaft, a housing mounted adjacent said head plate, said housing comprising a base having a gear chamber provided at the interior face and a recess formed in the exterior face thereof, having communication one with the other, a pinion carried by said traversing shaft and located in said gear chamber at the interior face of said base, a pinion carried by said spool and located in said recess at the exterior face of said base, a hand crank supported in operative position on said housing, drive gears, operable by said hand crank, coacting with said spool pinion and said traversing shaft pinion, and located at the exterior face of said base, with said drive gears being contained within said recess, and a cover for closing said recess to effect a self-contained gear box.

8. In a fishing reel of the class described, the combination of tail and head plates, connecting pillars between said plates, a spool, a line guide reversely threaded traversing shaft, a housing mounted adjacent said head plate, said housing being of generally cup-shape to provide an interior annular gear chamber opening on said head plate and comprising an annular base having the inner surface thereof facing said head plate, said base having an annular recess provided in the exterior face thereof and eccentrically located thereon effecting a gear chamber, a pinion carried by said traversing shaft and located in said interior gear chamber, a shaft for said spool extending through an aperture in the base of said exterior recess, a pinion for said spool mounted on its shaft on the portion thereof disposed in said recess, a hand crank supported in operative position on said housing, a pair of drive gears, operable by said hand crank, coacting with said spool pinion and said traversing shaft pinion, with said drive gears being located in said exterior recess, and a cover for closing said recess to effect a self-contained gear box.

9. In a fishing reel of the class described, the combination of tail and head plates, connecting pillars between said plates, a spool, a line guide reversely threaded traversing shaft, a housing mounted adjacent said head plate, said housing being of generally cup-shape to provide a gear chamber opening on said head plate and comprising a base having the inner surface thereof facing said head plate, said base having a gear chamber provided in the exterior face thereof, said second mentioned gear chamber having a base in which is formed a third gear chamber which communicates with said first mentioned gear chamber, a pinion carried by said traversing shaft and located in said first mentioned gear chamber, a pinion carried by said spool and located in said second mentioned gear chamber, a hand crank supported in operative position on said housing, a pair of drive gears, operable by said hand crank, coacting with said spool pinion and said traversing shaft pinion, one of said drive gears being located in said second mentioned gear chamber and the other in said third mentioned gear chamber.

10. In combination in a fishing reel, a frame, a detachable housing mounted adjacent said frame, a spool, a pinion therefor, a bearing for said spool supported in operative position on said housing, a line guide traversing shaft having a pinion operatively associated therewith, an end thrust bearing surface for said traversing shaft provided on said housing, and integral therewith, a drive gear assembly for said spool and traversing shaft pinions operatively supported on said housing and disposed within an exteriorly facing, eccentrically located recess provided in said housing, a crank, and a crank shaft, said spool bearing, end thrust bearing surface, drive gear assembly, and crank being removable with said housing.

11. In combination in a fishing reel, a frame including a tail plate, a head plate and pillars interconnecting with said plates, a detachable housing mounted adjacent said frame, a spool, a pinion therefor, a bearing for said spool supported in operative position on said housing, a line guide traversing shaft having a pinion operatively associated therewith, said head plate having a first opening therein permitting insertion and removal of said spool therethrough, and having a second opening therein permitting insertion and removal of said traversing shaft, said housing having integral surface means provided thereon adapted to close said first and second openings, when, and so long as, said housing is in assembled position, to maintain said spool and traversing shaft in operative position, a drive gear assembly for said spool and traversing shaft pinions and operatively supported on said housing, said housing having an outwardly facing recess therein within which said drive gear assembly is disposed, a cover for closing said recess to effect a self-contained gear box, a crank, a crank shaft, and a thrust bearing for said crank shaft supported in operative position on said housing, said spool bearing, drive gear assembly, and crank being removable with said housing.

12. In a fishing reel, in combination, a frame including a tail plate, a head plate spaced therefrom, and pillars connecting said plates, a detachable housing mounted adjacent said frame, a spool, a pinion therefor, a line guide traversing shaft having a pinion operatively associated therewith, said head plate having a first opening therein permitting insertion and removal of said spool therethrough, and having a second opening therein permitting insertion and removal of said traversing shaft, said housing having surface means provided thereon adapted to close said first and second openings, when, and so long as, said housing is in assembled position, to maintain said spool and traversing shaft in operative position, a drive gear assembly for actuating said pinions disposed in a recess provided in the exterior surface of said housing, a support member removably mounted on said housing, means mounting said drive gear assembly on said support member, said means comprising a crank shaft, a bearing for said spool mounted on said support member, a crank on said support member, a thrust bearing for said crank shaft provided on said support member, and means securing said support member to said housing, said support member being removable axially from said housing to carry said spool bearing, said crank shaft, crank, and drive gear assembly all with it and all in assembled operative position.

13. In combination in a fishing reel, a frame including a tail plate and a head plate interconnected by pillars, a detachable housing mounted adjacent said frame, a spool, a pinion therefor, a bearing for said spool supported in operative position on said housing, a line guide traversing shaft having a pinion operatively associated therewith, said head plate having a first opening therein permitting insertion and removal of said spool therethrough, and having a second opening therein permitting insertion and removal of said traversing shaft, said housing having an end thrust bearing surface for said traversing shaft provided thereon adapted to close said second opening to maintain said traversing shaft in operative position, a second surface on said housing for closing said first opening to maintain said spool in operative position, said surfaces being disposed in closing position when and so long as said housing is in assembled position, a drive gear assembly for actuating said spool and traversing shaft pinions, said housing having a recess provided in its exterior surface and located eccentrically thereon and within which said drive gear assembly is disposed, a removable cover closing said recess, a crank and crank shaft carried by said cover and removable therewith.

14. The combination in a level winding fishing reel of a frame, said frame including a tail plate, a head plate, pillars interconnecting the same, a removable housing mounted adjacent said frame, a spool provided with a pinion, a bearing for said spool, a line guide traversing shaft provided with a pinion, said head plate having a first opening therein permitting insertion and removal of said spool therethrough, and having a second opening therein permitting insertion and removal of said traversing shaft, said housing having an end thrust bearing surface for said traversing shaft provided thereon adapted to close said second opening to maintain said traversing shaft in operative position, a second surface on said housing for closing said first opening to maintain said spool in operative position, said surfaces being disposed in closing position when and so long as said housing is in assembled position, a drive gear assembly operatively interconnected with said spool pinion and said traversing shaft pinion, said housing having a recess provided in its exterior surface and disposed eccentrically thereon and within which said drive gear assembly is located, a removable cover on said housing for closing said recess, said removable cover supporting said spool bearing, a stub shaft carried by said housing adapted to receive a crank shaft, a crank, and a thrust bearing for said crank shaft, said crank shaft, crank, and drive gear assembly all being mounted on said cover, and being removable in assembled relation on said cover together with said spool bearing.

15. In combination in a fishing reel, a frame including interconnected tail and head plates, a spool, a pinion operatively associated therewith, a reversely threaded shaft, a pinion carried by said shaft, a drive gear meshing with said spool pinion, a second drive gear meshing with said shaft pinion, a drive shaft for actuation of said drive gears, a crank for said drive shaft, and a housing mounted adjacent said head plate, said housing being of generally cup-shape to provide a gear chamber opening on said head plate and comprising a base having the inner surface thereof facing said head plate, said base having a gear chamber provided in the exterior face thereof, said second mentioned gear chamber having a base in which is formed a third gear chamber which communicates with said first mentioned gear chamber, and a cover plate for closing said chambers on said exterior face, said head plate having a first opening therein permitting insertion and removal of said spool therethrough, and having a second opening therein permitting insertion and removal of said traversing shaft, said housing having surface means provided thereon adapted to close said first and second openings, when, and so long as, said housing is in assembled position, to maintain said spool and traversing shaft in operative position.

16. In a fishing reel of the class described, the combination of tail and head plates, connecting pillars between said plates, a spool, a line guide reversely threaded traversing shaft, a housing mounted adjacent said head plate, said housing comprising a base having a gear chamber provided at the interior face and an outwardly opening recess provided at the exterior face of said base, having communication one with the other, a pinion carried by said traversing shaft and located in the gear chamber at the interior face of said base, a pinion carried by said spool and located in said recess at the exterior face of said base, a hand crank supported in operative position on said housing, drive gears, operable by said hand crank, coacting with said spool pinion and said traversing shaft pinion, and located in said recess at the exterior face of said base, said head plate having a first opening therein permitting insertion and removal of said spool therethrough, and having a second opening therein permitting insertion and removal of said traversing shaft, said housing having an end thrust bearing surface for said traversing shaft provided thereon adaped to close said second opening and surface means on said housing for closing said first opening to maintain said spool in operative position, said surfaces being disposed in closing position when and so long as said housing is in assembled position.

17. In a fishing reel of the class described, the combination of a tail plate, a head plate and connecting pillars between said plates, a spool, a line guide reversely threaded traversing shaft, a housing mounted adjacent said head plate, said housing being of generally cup-shape to provide a gear chamber opening on said head plate and comprising a base having the inner surface thereof facing said head plate, said head plate having a first opening therein permitting insertion and removal of said spool therethrough, and having a second opening therein permitting insertion and removal of said traversing shaft, said housing having an end thrust bearing surface for said traversing shaft provided on the base thereof adapted to close said second opening to maintain said traversing shaft in operative position, a second surface on said housing base for closing said first opening to maintain said spool in operative position, said surfaces being disposed in closing position when and so long as said housing is in assembled position, said housing base having a gear chamber provided in the exterior face thereof, said second mentioned gear chamber having a base in which is formed a third gear chamber which communicates with said first mentioned gear chamber, a pinion carried by said traversing shaft and located in said first mentioned gear chamber, a pinion carried by said spool and located in said second mentioned gear chamber, a drive gear assembly for actuating said pinions, said drive gear assembly having one gear thereof located in said second mentioned gear chamber and a second gear located in said third mentioned gear chamber, a support member removably mounted on said housing, means mounting said drive gear assembly on said support member, said means comprising a crank shaft, a bearing for said spool mounted on said support member, a crank on said support member, and means securing said support member to said housing, said support member being removable from said housing to carry said spool bearing, said crank shaft, crank, and drive gear assembly all with it and all in assembled operative position.

HENRY I. MANDOLF.
HOWARD R. CHAPIN.

REFERENCES CITED

The following references are of record in the file of this patent:

UNITED STATES PATENTS

| Number | Name | Date |
| --- | --- | --- |
| 147,414 | MacCord | Feb. 10, 1874 |
| 1,817,102 | Russell | Aug. 4, 1931 |
| 1,898,316 | Schafer | Feb. 21, 1933 |
| 1,942,710 | Kautzky, Jr. | Jan. 9, 1934 |